June 26, 1923.
O. D. PARSONS
SLIDE RULE
Filed May 26, 1919
1,459,857
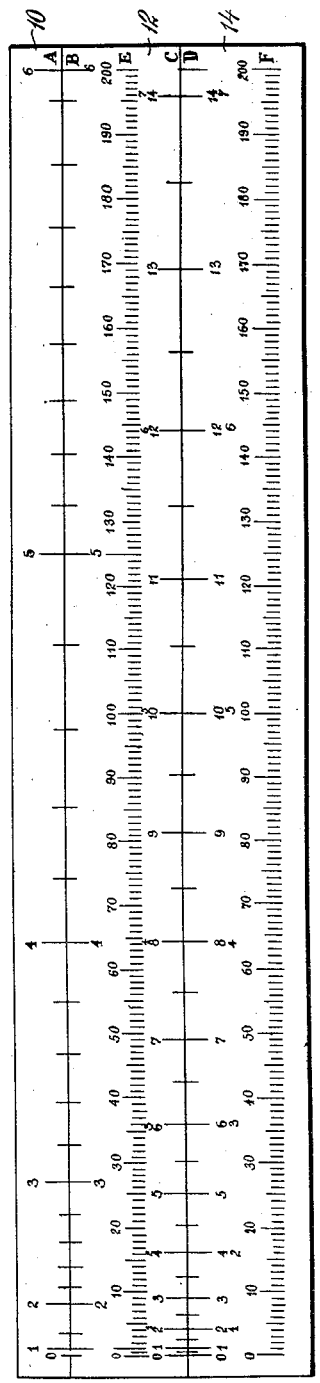
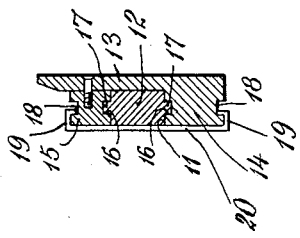
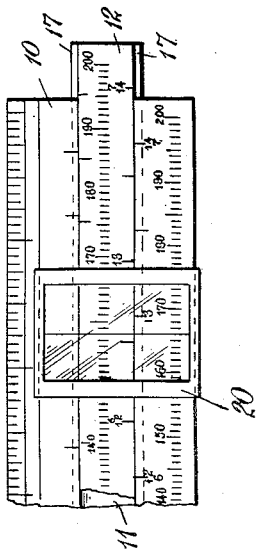
Inventor
Olin D. Parsons
By his Attorney
E. W. Marshall Patented June 26, 1923.

1,459,857

UNITED STATES PATENT OFFICE.

OLIN D. PARSONS, OF WEST ENGLEWOOD, NEW JERSEY.

SLIDE RULE.

Application filed May 26, 1919. Serial No. 299,964.

*To all whom it may concern:*

Be it known that I, OLIN D. PARSONS, a citizen of the United States of America, and a resident of West Englewood, county of Bergen, and State of New Jersey, have invented certain new and useful Improvements in Slide Rules, of which the following is a specification, reference being had to the accompanying drawings, forming a part thereof.

My invention relates to mechanical calculating devices and has special reference to such as embody a pair of relatively movable scales and are known as "slide rules."

One object of my invention is to provide a calculating device of the aforesaid character that shall be adapted for the rapid and accurate solution of problems involving the addition and subtraction of powers of quantities as typified by the simple formula $x^2+y^2=z^2$. Having given the values of $x$ and $y$, it is possible to read directly on my improved slide rule the value of $z$ without the necessity of either raising the known values to the indicated powers or of taking the root of their sums.

Ordinary slide rules and calculating devices are used for solving problems involving the multiplication and division of quantities by the addition and subtraction of the logarithms of those quantities. Thus it is evident that the mechanical process employed is such as to add and subtract quantities. This is also true of the mechanical process employed in the utilization of my improvement which may therefore be considered broadly as pertaining to the same class of apparatus as the usual slide rule.

My invention departs from anything of the kind known hitherto, in that I provide for the addition and subtraction of powers and roots of numbers, when the numbers themselves are known, without necessarily determining what the actual values of the powers or roots are.

Other objects and advantages of my invention will be set forth hereinafter, and in order that my invention may be thoroughly understood I will now proceed to describe the same in the following specification, and will then point out the novel features thereof in appended claims.

Referring to the drawings:

Figure 1 is a diagrammatic view of the scale surface of a slide rule arranged and constructed to constitute an embodiment of my invention.

Figure 2 is a plan view showing a portion of a slide rule structure of the type which I prefer to employ.

Figure 3 is a transverse sectional view of the same structure.

In the drawings, 10 designates the body of the scale having a slot 11 in which a slide 12 is movably mounted. The body is preferably formed of a flat strip 13 having an integral guide projection 14, and a detachable and adjustable guide projection 15, on opposite sides of the slot 11. The guide projections are grooved at 16—16 to receive longitudinal beads 17 of the slide 12, and are grooved at 18—18 to cooperate with the flanges 19 of a rider 20.

No further description of the construction or mechanical operation of the rule is required as structures of the kind are well known and other suitable structures may be utilized within the spirit and scope of my invention.

Referring particularly to the scale diagram of Figure 1, the scales shown are respectively designated A, B, C, D, E and F, of which B, C and E are on the slide 12 and A, D and F on the body 10 of the rule. Scales E and F are identical first power scales having uniformly spaced graduations.

Scales C and D are identical and are laid out to indicate the square root of the numbers which appear on the scales E and F.

Scales A and B are identical and are laid out to designate the cube root of the numbers appearing on the scales E and F.

Other scales may of course be added to represent other powers or roots either integral or fractional of the numbers indicated in the units scale. In order to compare between scales it will be noted that 5 on the scale C is opposite 25 on the scale E. In other words, 5 is the square root of 25. 3 on the scale B is opposite 27 on scale E, 3 being the cube root of 27. And so on, all the values indicated on the scale B are the cube roots of the values appearing opposite on the scale E.

The calculating device is utilized by moving the slide along to add or subtract square roots or cube roots, the result being obtained directly by reading opposite on the scale E.

For example, to solve a problem such as $x^2+y^2=z^2$, if $x=3$ and $y=4$, move the slide 12 until the 0 of scale C is opposite 3 of scale D; then read the number on scale D under 4 of scale C which is 5. Thus the value of $z$ is obtained immediately from the other known quantities without squaring the $x$ or the $y$, without adding them together and without taking the square root of the number $z^2$.

In like manner it is possible to treat $A^3-B^3=C^3$. In this case if A is 3 and B is 2, $C=2.68$.

Where a series of squares or cubes or other powers are to be added or subtracted such as for example $x^2+y^2+z^2=r^2$ the value of the known quantities will be added or subtracted on the square root scale and the answer read directly from the scale. If the equation reads $x^2+y^2=s$; if $x$ is 2.4 and $y$ is 3.7, it is possible to obtain the value of $s$ by adding the values 2.4 and 3.7 on the root scales C and D and referring over to the unit scale F for the result which is 19.4.

These simple examples will be sufficient to enable those familiar with slide rules in general and with mathematical formulas, to clearly understand the mode of operation and the advantages of my invention.

My improved slide rule is particularly well adapted for use by electrical engineers in the calculation of impedance where the ohmic resistance squared plus the inductive resistance or reactance squared, equals the square of the impedance.

The scales C and D may have two sets of values, the second set representing mathematical functions of the powers or roots which form the first set. As shown the second set of values of power or roots equals the first set times the constant $\frac{1}{2}$, and the constant multiplier $\frac{1}{2}^2=\frac{1}{4}$ is then applied to the units scale. For example 10 on the scale D may be taken as 5 in which case 100 on the F scale would be taken as 25 because in such cases the numbers on the F scale would be divided by 4. Other scales may be added for other purposes but the principle involved is the same.

Furthermore my invention may be embodied as a part of a more complex rule which may for example have a set of logarithmic scales as well as my improved power and root scales.

What I claim is:

1. A calculating device comprising a member having a scale thereon unequally graduated to indicate a series of values raised to a predetermined power, and relatively movable graduated means adapted to cooperate therewith for adding or subtracting powers or roots of said values.

2. A calculating device comprising a member having a uniformly graduated units power scale, another scale graduated to indicate predetermined powers or roots of the values on the first scale, and relatively movable graduated means adapted to cooperate with said scales for adding or subtracting powers or roots of values.

3. A calculating device comprising a member having a scale thereon unequally graduated to indicate a series of values raised to a predetermined power, and a relatively adjustable cooperating member provided with a like scale and adapted to cooperate with the first member to add and subtract powers of values.

4. A calculating device comprising a member having a uniformly graduated units power scale, another scale graduated to indicate a predetermined power or root of the values on the first scale, and a movable member having correspondingly graduated scales arranged for the addition and subtraction of powers or roots.

5. A slide rule comprising a base member having a uniformly graduated units power scale thereon, a plurality of power or root scales also graduated thereon and a slide mounted on the base having scales paralleling those of the base and adapted to be adjusted for adding and subtracting the powers or roots.

6. A calculating device comprising a member having a scale thereon unequally graduated to indicate a series of values raised to a predetermined function of a predetermined power of the respective values, and relatively movable, graduated means adapted to cooperate therewith to solve mathematical computations involving powers or roots of values.

7. A calculating device comprising a member having a uniformly graduated units power scale, another scale graduated to indicate predetermined functions of powers of the values on the first scale, and relatively movable, graduated means adapted to cooperate with said scale for solving mathematical computations involving powers or roots of values.

8. A calculating device comprising a member having a scale thereon unequally graduated to indicate a series of values raised to a predetermined function of a predetermined power, and a relatively adjustable cooperating member provided with a like scale and adapted to cooperate with the first member to add or subtract functions of powers of said values.

9. A calculating device comprising a member having a uniformly graduated units power scale, another scale graduated to indicate a function of a predetermined power or root of the values of the first scale, and a movable member having correspondingly graduated scales arranged for the addition and subtraction of functions of the powers or roots.

In witness whereof, I have hereunto set my hand this 22nd day of May, 1919.

OLIN D. PARSONS.